US010940915B2

(12) United States Patent
Ichida et al.

(10) Patent No.: US 10,940,915 B2
(45) Date of Patent: Mar. 9, 2021

(54) BICYCLE SHIFTER, BICYCLE TRANSMISSION DEVICE, AND BICYCLE ELECTRIC SYSTEM

(71) Applicant: Shimano Inc., Osaka (JP)

(72) Inventors: Tadashi Ichida, Osaka (JP); Noriaki Takahashi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/628,155

(22) Filed: Jun. 20, 2017

(65) Prior Publication Data

US 2017/0283002 A1    Oct. 5, 2017

Related U.S. Application Data

(62) Division of application No. 14/819,795, filed on Aug. 6, 2015, now Pat. No. 9,950,767.

(30) Foreign Application Priority Data

Sep. 5, 2014    (JP) .............................. JP2014-181748

(51) Int. Cl.
*B62M 6/45* (2010.01)
*B62M 6/50* (2010.01)
*B62M 6/55* (2010.01)
*B62M 25/08* (2006.01)
*B62M 25/04* (2006.01)

(52) U.S. Cl.
CPC ................ *B62M 6/45* (2013.01); *B62M 6/50* (2013.01); *B62M 6/55* (2013.01); *B62M 25/04* (2013.01); *B62M 25/08* (2013.01)

(58) Field of Classification Search
CPC . B62M 6/40; B62M 6/45; B62M 6/50; B62M 6/55; B62M 11/04; B62M 9/121; B62M 9/122; B62M 9/132
See application file for complete search history.

(56) References Cited

U.S. PATENT DOCUMENTS

| 4,072,204 | A | 2/1978 | Leighton et al. | |
| 4,490,127 | A | 12/1984 | Matsumoto et al. | |
| 5,903,214 | A | 5/1999 | Watarai | |
| 6,380,731 | B1 * | 4/2002 | Nishimoto | B62M 25/08 |
| | | | | 280/238 |
| 2003/0071437 | A1 | 4/2003 | Takeda | |
| 2004/0206188 | A1 | 10/2004 | Takamoto et al. | |
| 2006/0183584 | A1 | 8/2006 | Fukuda | |
| 2009/0054182 | A1 * | 2/2009 | Miki | B62K 23/06 |
| | | | | 474/80 |

(Continued)

FOREIGN PATENT DOCUMENTS

| CN | 101734338 A | 6/2010 |
| DE | 100 56 483 A1 | 5/2001 |

(Continued)

*Primary Examiner* — Charles A Fox
*Assistant Examiner* — Lori Wu
(74) *Attorney, Agent, or Firm* — Global IP Counselors, LLP

(57) ABSTRACT

A bicycle transmission is provided that includes a transmission, a connecting portion, a cable and a detection device. The connecting portion is connected to the transmission. The cable is coupled to the connecting portion to operate the transmission. The detection device is arranged to detect movement of the connecting portion.

15 Claims, 12 Drawing Sheets

(56) References Cited

U.S. PATENT DOCUMENTS

| | | | | |
|---|---|---|---|---|
| 2012/0112739 | A1* | 5/2012 | Huang | G01R 33/072 |
| | | | | 324/251 |
| 2013/0014607 | A1 | 1/2013 | Miki et al. | |
| 2014/0144275 | A1 | 5/2014 | Kariyama et al. | |
| 2014/0216198 | A1* | 8/2014 | Kariyama | F16C 1/226 |
| | | | | 74/502.6 |
| 2014/0235383 | A1* | 8/2014 | Wesling | F16H 9/06 |
| | | | | 474/80 |

FOREIGN PATENT DOCUMENTS

| | | |
|---|---|---|
| DE | 600 35 760 T2 | 7/2008 |
| EP | 1 568 587EP A2 | 8/2005 |
| JP | 51-97141 A | 8/1976 |
| JP | 53-535 A | 1/1978 |
| JP | 58-49592 A | 3/1983 |
| JP | 4-358989 A | 12/1992 |
| JP | 7-10069 A | 1/1995 |
| JP | 9-123980 A | 5/1997 |
| JP | 10-35566 A | 2/1998 |
| JP | 10-181675 A | 7/1998 |
| JP | 2004-268854 A | 9/2004 |
| JP | 3717076 B2 | 11/2005 |
| JP | 2006-219029 A | 8/2006 |
| JP | 2008-296652 A | 12/2008 |
| JP | 2009-196570 A | 9/2009 |
| JP | 4885063 B2 | 2/2012 |
| TW | M423665 U | 3/2012 |

\* cited by examiner

BICYCLE SHIFTER, BICYCLE TRANSMISSION DEVICE, AND BICYCLE ELECTRIC SYSTEM

CROSS-REFERENCE TO RELATED APPLICATIONS

This application is a divisional application of U.S. patent application Ser. No. 14/819,795 filed on Aug. 6, 2015. The entire disclosure of U.S. patent application Ser. No. 14/819,795 is hereby incorporated herein by reference. This application claims priority This application claims priority to Japanese Patent Application No. 2014-181748, filed on Sep. 5, 2014. The entire disclosure of Japanese Patent Application No. 2014-181748 is hereby incorporated herein by reference.

BACKGROUND

Field of the Invention

This invention generally relates to a bicycle shifter, a bicycle transmission device and a bicycle electric system. In the case of the bicycle electric system, at least one of the bicycle shifter and the bicycle transmission device is provided in the bicycle electric system.

Background Information

Some bicycles are provided with an assist motor to assist the rider in driving the bicycle. Some bicycles are provided with a gear shift cable that interconnects a shifter and a bicycle transmission device. For example, Japanese Patent No. 4,885,063 discloses a bicycle comprising an assist motor and a transmission. In this bicycle, an assist force of the assist motor is determined for a particular shift position by detecting the displacement of a gear shift cable.

SUMMARY

Generally, most gear shift cables typically include an outer casing and an inner cable. However, in the conventional technology described above, dividing or removing the outer casing is necessary in order to detect the movement of the inner cable. For this reason, there is the risk of reducing the durability of the inner cable.

In view of the state of the known technology, one object of the present invention is to provide a bicycle transmission device and a bicycle electric system able to detect a gear shift or predict a gear shift without specially processing the gear shift cable.

In accordance with a first aspect of the present invention, a bicycle transmission device comprises a transmission, a connecting portion, a cable and a detection device. The connecting portion is connected to the transmission. The cable is coupled to the connecting portion to operate the transmission. The detection device arranged to detect movement of the connecting portion.

In accordance with a second aspect of the present invention, a bicycle electric system comprises a transmission, an electric actuator, a connecting portion, a detection device and a controller. The electric actuator is configured to operate the transmission. The connecting portion connects the electric actuator to the transmission. The detection device is arranged to detect movement of one of the electric actuator and the connecting portion. The controller is programmed to control an assist motor for assisting the manual drive force based on a signal from the detection device. The controller is programmed to either reduce an output of the assist motor or stop the output of the assist motor based on the signal.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
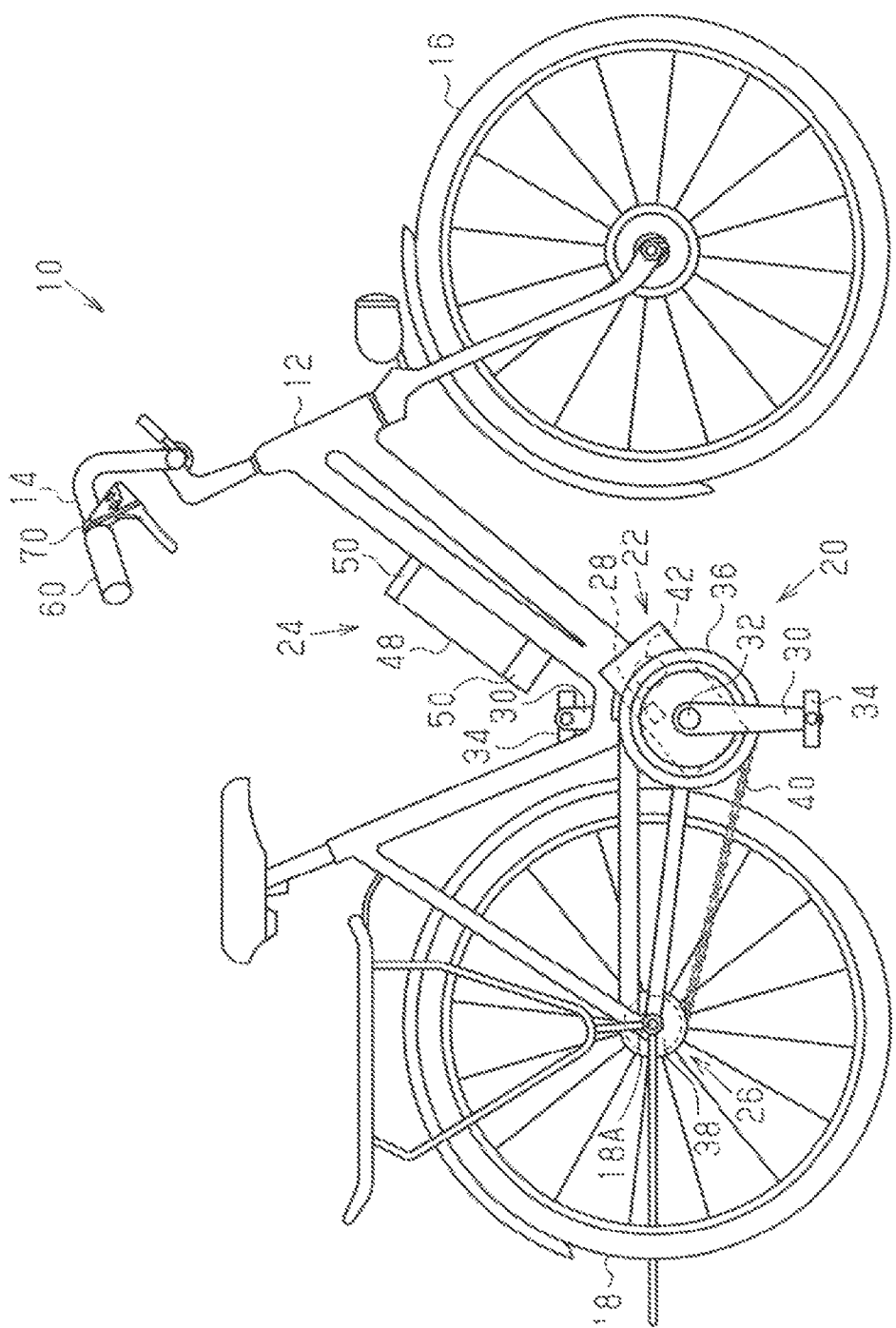
FIG. 1 is a side elevational view of a bicycle equipped with a bicycle electric system in accordance with a first embodiment.

Referring initially to FIG. 1, a bicycle 10 is illustrated that is equipped with a bicycle electric system in accordance with a first embodiment. The bicycle 10 comprises a frame 12, a handlebar 14, a front wheel 16, a rear wheel 18, a drive mechanism 20, an assist mechanism 22, a battery unit 24, a transmission device 26, a shifter 70 and a controller 28. The assist mechanism 22, the transmission device 26, the shifter 70, and the controller 28 form parts of a bicycle electric system.

The drive mechanism 20 comprises left and right crank arms 30, a crankshaft 32, left and right pedals 34, a front sprocket 36, a rear sprocket 38, and a chain 40. The left and right crank arms 30 are rotatably attached to the frame 12 via the crankshaft 32. The pedals 34 are attached to the crank arms 30 by pedal shafts with the pedals being rotatably disposed on the pedal shafts.

The front sprocket 36 is coupled with the crankshaft 32. The front sprocket 36 is provided coaxially with the crankshaft 32. The front sprocket 36 can be coupled in order to not rotate relatively with the crankshaft 32, or the front sprocket can be coupled via a one-way clutch (not shown) so that the front sprocket 36 will also rotate forward when the crankshaft 32 rotates forward.

The rear sprocket 38 is rotatably attached around an axle 18A of the rear wheel 18. The rear sprocket 38 is coupled with the rear wheel 18 via the one-way clutch. The chain 40 is wound onto the front sprocket 36 and the rear sprocket 38. When the crank arm 30 rotates due to the manual drive force that is applied to the pedal 34, the rear wheel 18 is rotated by the front sprocket 36, the chain 40 and the rear sprocket 38.

The assist mechanism 22 assists the manual drive force that rotates the front sprocket 36 with the drive of the motor 42. The assist mechanism 22 is electrically connected to an assist operating unit 44 shown in FIG. 4. The assist mechanism 22 comprises a sensor for detecting the manual drive force that has been input from the crank and that drives the assist motor 42 according to the manual drive force. The assist mechanism 22 comprises an assist motor 42 and a reduction gear (not shown). The assist motor 42 is an electric motor. The rotation of the assist motor 42 is transmitted to the front sprocket 36 via the reduction gear. A one-way clutch (not shown) can be provided between the assist motor 42 and the front sprocket 36 for preventing the motor from being rotated by the manual drive force when the crank arm 30 rotates forward.

The battery unit 24 comprises a battery 48 and a battery holder 50 for detachably attaching the battery 48 to the frame 12. The battery 48 includes one or a plurality of battery cells. The battery 48 is configured as a secondary battery. The battery 48 is electrically connected to the assist motor 42, and supplies electric power to the assist motor 42.

The assist mechanism 22 is operated by the assist operating unit 44. When a button 46A of the assist operating unit 44 is pressed, the controller 28 drives the assist motor 42 to increase the output of the assist motor 42. When a button 46B of the assist operating unit 44 is pressed, the controller 28 stops the assist motor 42 to decrease the output of the assist motor 42. The controller 28 includes a processor and a memory device with a predetermined software program stored therein for controlling the assist motor 42.

Figure 2:
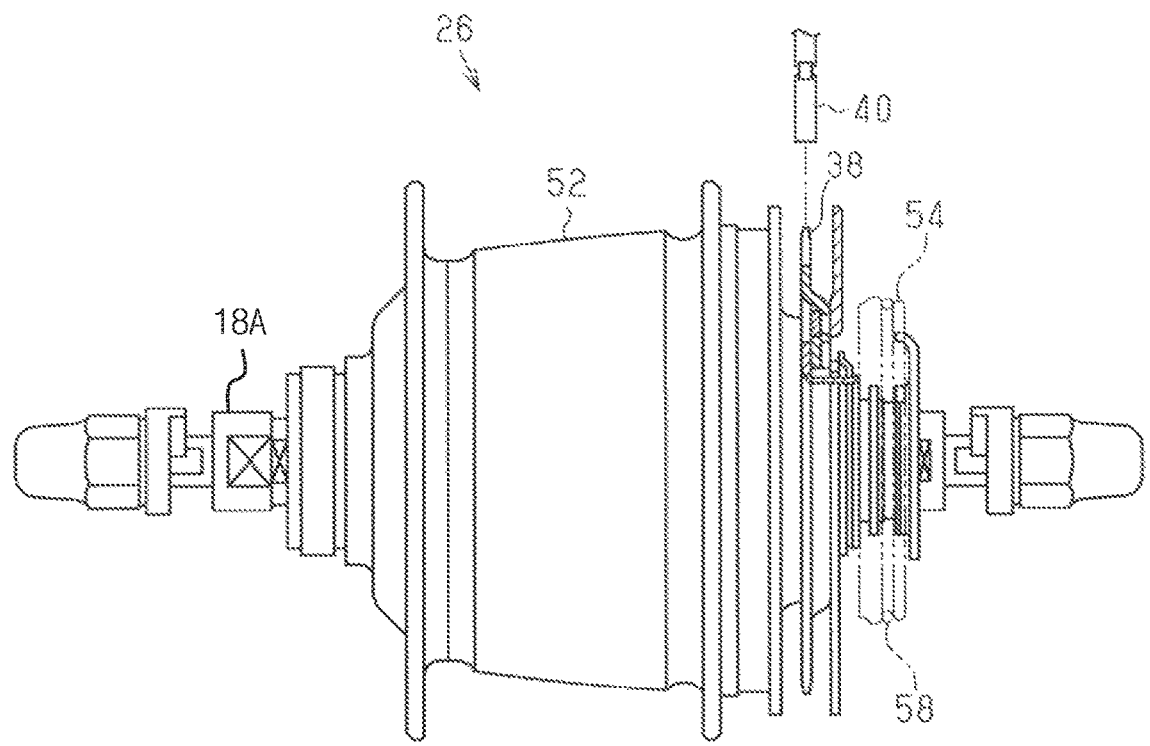
FIG. 2 is a front elevational view of the transmission device of the bicycle illustrated in FIG. 1.

As shown in FIGS. 1 and 2, the transmission device 26 comprises an internal hub transmission 52 (i.e., an internally geared hub or a continuously variable transmission hub) and a connecting portion 54. The transmission device 26 may comprise an external transmission instead of the internal huh transmission. The internal hub transmission 52 is configured to change the speed of the rotation of the rear sprocket 38. The connecting portion 54 is operatively connected to the internal hub transmission 52 for operating the internal hub transmission 52 to change gears. The internal hub transmission 52 is integrated with the axle 18A of the rear wheel 18. The internal hub transmission 52 comprises a plurality of shift positions corresponding to the internal gear configuration.

Figure 3:
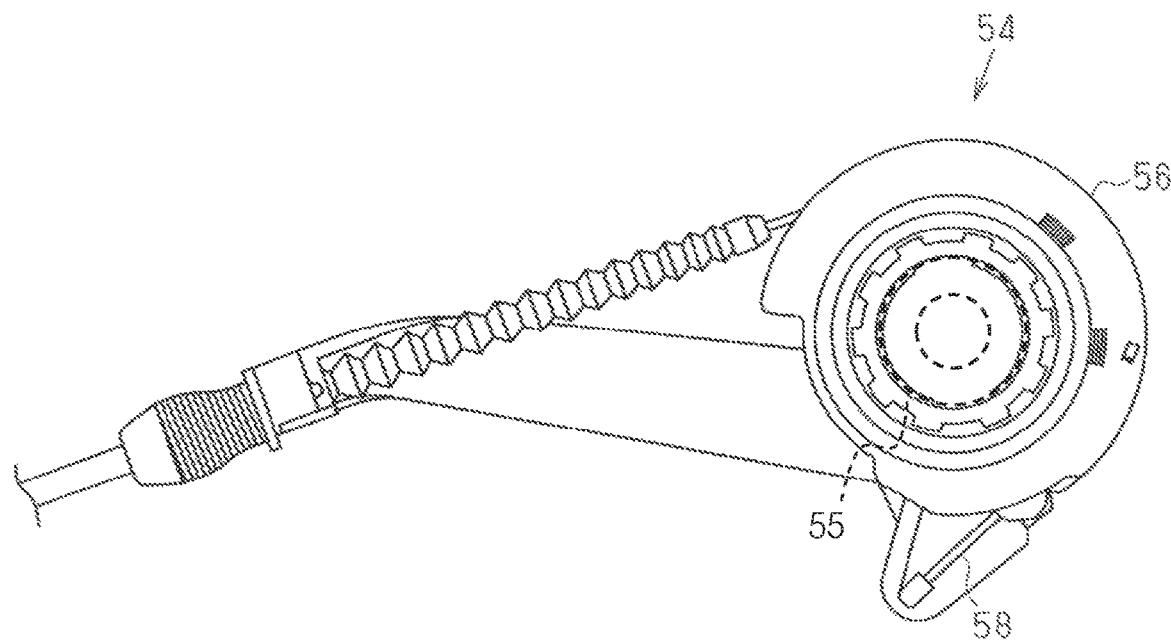
FIG. 3 is a rear view of the connecting portion in FIG. 2.

As shown in FIG. 3, the connecting portion 54 comprises a fixing portion 55 that is directly or indirectly fixed to the axle 18A (i.e., the hub shaft) and a rotating body 56 that is rotatably provided to the fixing portion 55 with respect to the axle 18A. The connecting portion 54 is detachably attached to the end of the internal hub transmission 52 shown in FIG. 2. One end of a cable 58 is wound to the outer periphery of the rotating body 56 for transmission of a force to the rotating body 56. In this way, the rotating body 56 rotates with the movement of the cable 58. With this arrangement, a mechanical element inside of the internal hub transmission 52 that is coupled to the rotating body 56 is rotated. With this arrangement, the connection state of the gears that form a planetary gear mechanism inside the internal hub transmission 52 is changed, and the shift position is changed.

Figure 4:
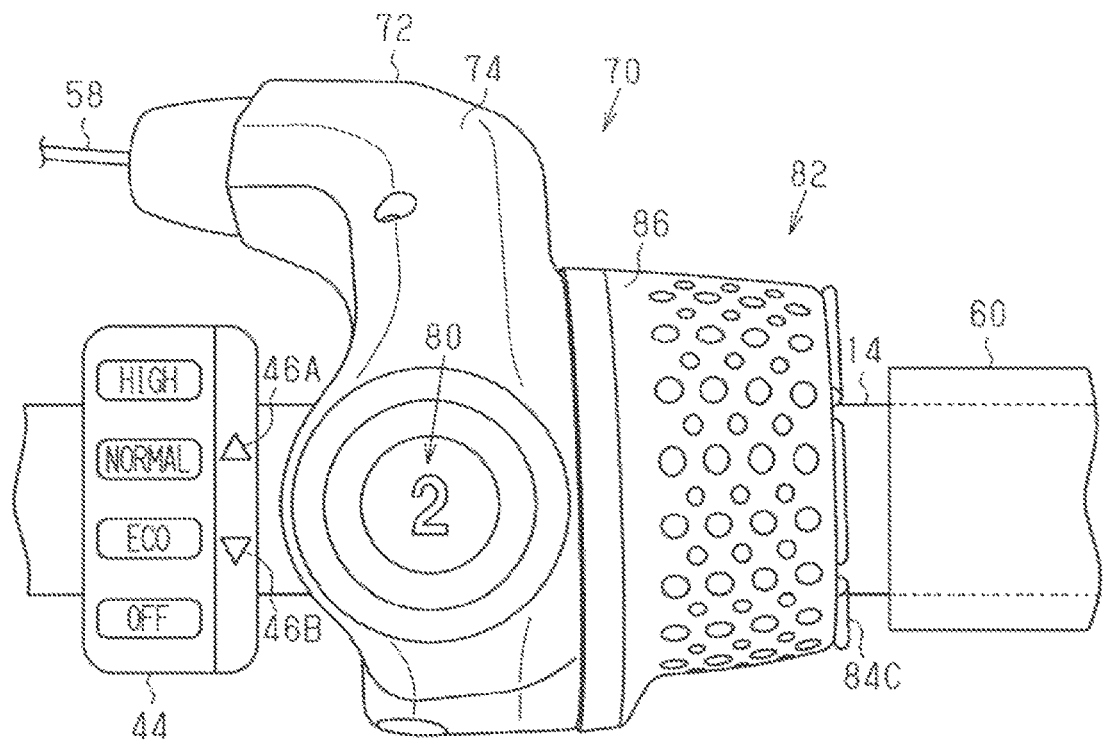
FIG. 4 is a front view of a shifter that is mounted to the bicycle in FIG. 1.
Figure 5:
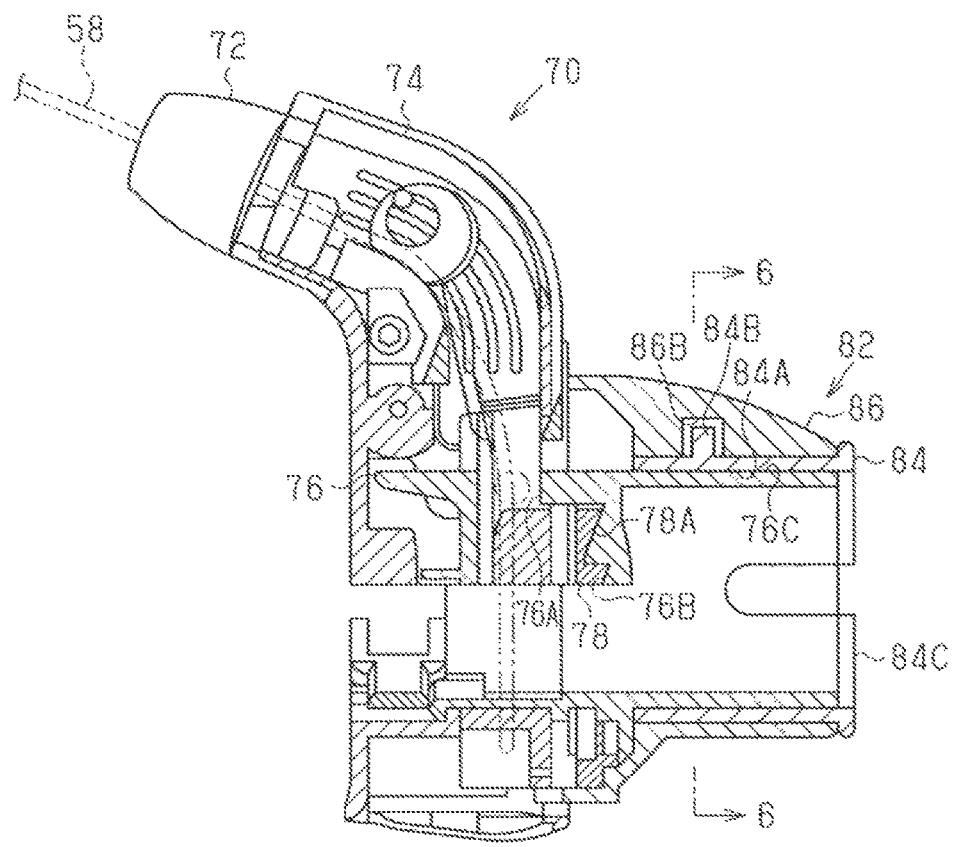
FIG. 5 is a cross sectional view of the shifter illustrated in FIG. 3.

As shown in FIG. 4, a grip 60 is rotatably attached to the handlebar 14 with respect to the handlebar 14. A shifter 70 is attached to the handlebar 14 for moving the cable 58 in response to an operation of the grip 60 by the rider. The shifter 70 comprises a main body portion 72 that is fixed to the handlebar 14. As shown in FIG. 5, the main body portion 72 comprises a casing 74, a winding element 76, a clutch 78 and a display unit 80 (refer to FIG. 4). The casing 74 is detachably attached to the handlebar 14 via a holder that is not shown. The winding element 76 is rotatably arranged inside the casing 74 for winding the cable 58. The clutch 78 is provided for regulating the rotation of the winding element 76. The winding element 76 includes an end surface with a plurality of triangular pawls 76B circumferential arranged on the end surface. The display unit 80 is provided for displaying the current shift position. The winding element 76 has a groove 76A to which the end of the cable 58 is fitted.

The clutch 78 is a disk-shaped member that is fixed to the casing 74. The clutch 78 comprises a plurality of triangular pawls 78A that are arranged in the circumferential direction on the surface. The triangular pawls 76B of the winding element 76 mesh with the triangular pawls 78A of the clutch 78. The winding element 76 is pressed against the clutch 78 by a spring that is not shown.

The shifter 70 comprises an operating unit 82 that is attached to the main body portion 72 and that moves the winding element 76. The operating unit 82 comprises a first operating part 84 and a second operating part 86. The first operating part 84 is configured for moving the winding element 76. The second operating part 86 is coupled to the first operating part 84 and is movable with respect to the first operating part 84. Meanwhile, a rubber cover can be attached to the outer periphery of the second operating part 86.

The first operating part 84 is a tubular member. The first operating part 84 has a female spline 84A is formed on an inner periphery thereof. The female spline 84A is fitted to a male spline 76C that is formed on an outer periphery of the winding element 76. As a result, the first operating part 84 can be integrally rotated with the winding element 76.

The second operating part 86 is a tubular member that covers the first operating part 84. The second operating part 86 is coupled with a claw 84C that is formed at the end of the first operating part 84. The claw 84C regulates the axial movement of the second operating part 86 along the rotational axis direction.

Figure 6:
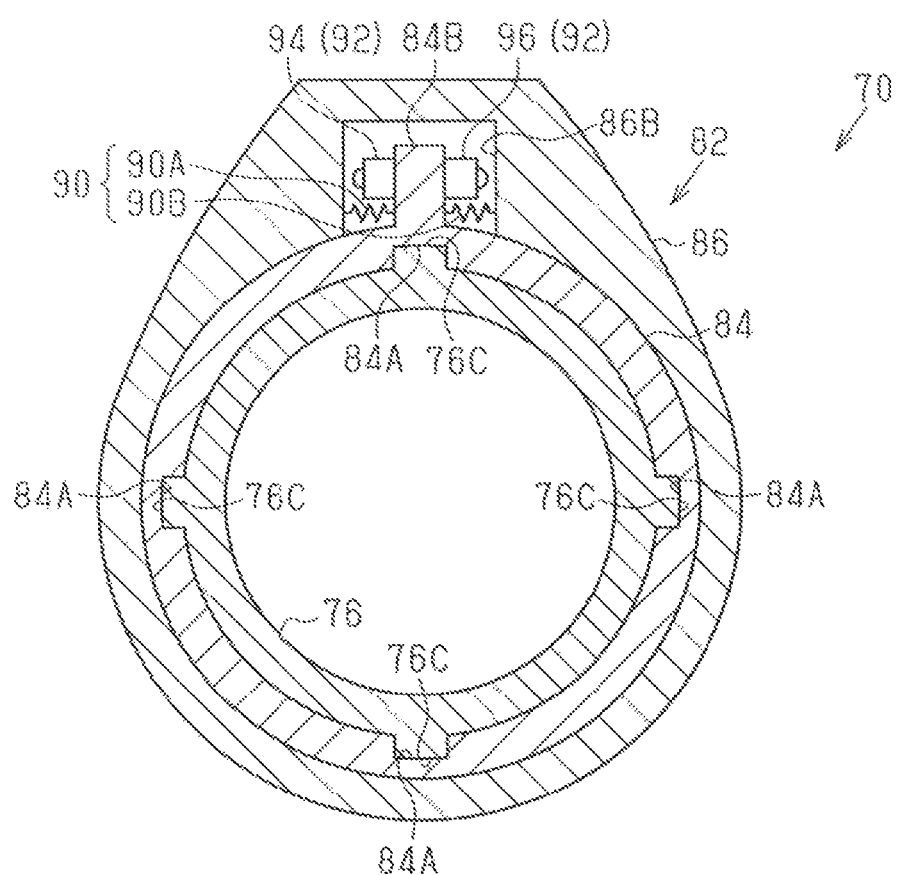
FIG. 6 is a cross sectional view of the shifter as seen along section line 6-6 of FIG. 5.

As shown in FIG. 6, a recess 86B is formed on the inner periphery of the second operating part 86. A protrusion 84B that is formed on the outer periphery of the first operating part 84 is fitted to the recess 86B. The recess 86B is larger than the protrusion 84B in the circumferential direction of the operating unit 82. For this reason, the second operating part 86 is able to slightly rotate relative to the first operating part 84. A sleeve or a bearing can be provided between the outer peripheral surface of the first operating part 84 and the inner peripheral surface of the second operating part 86 for making the relative movement smooth.

The first operating part 84 does not move when the second operating part 86 moves in a free range of the range in which the second operating part 86 is able to move. The free range of movement ranges from a second initial position of the second operating part 86 to a second prescribed position. The second initial position is, for example, a relative rotational position shown in FIG. 6. Thus, the second initial position is a rotational position in which the center of the protrusion 84B matches with the center of the recess 86B in the circumferential direction. The second initial position is also a rest position in that no external force is applied to the second operating part 86. The second prescribed position is, for example, a relative rotational position shown in FIG. 7. Thus, the second prescribed position is a rotational position in which the protrusion 84B cannot move any further with respect to the recess 86B in the circumferential direction. Meanwhile, the operating unit 82 rotates in both directions of the circumferential direction from the second initial position. For this reason, the second prescribed position includes the relative rotational position shown in FIG. 7 and a relative rotational position that is bilaterally symmetric to FIG. 7.

The winding element 76 moves along with the first operating part 84 in an interlocking range of the range in which the first operating part 84 is able to move. The interlocking range of movement ranges from a first initial position of the first operating part 84 to a first prescribed position. The first initial position is, for example, the first rotational position shown in FIG. 7. Thus, the first initial position is a rotational position in which the protrusion 84B cannot move any further with respect to the recess 86B in the circumferential direction. The first prescribed position is, for example, a rotational position in which the first operating part 84 is rotated more than in FIG. 7 and in which the triangular pawl 76B of the winding element 76 shown in FIG. 5 has passed over the triangular pawl 78A of the clutch 78.

As shown in FIG. 6, the operating unit 82 further comprises a return mechanism 90. The return mechanism 90 returns the second operating part 86 to the second initial position when the operating unit 82 is not being operated. The return mechanism 90 comprises a first spring 90A and a second spring 90B. The first spring 90A is disposed between one end of the protrusion 84B in the circumferential direction and the recess 86B. The second spring 90B is disposed between the other end of the protrusion 84B in the circumferential direction and the recess 86B. The return mechanism 90 applies a reaction force to the second operating part 86 so that the relative rotational position of the second operating part 86 with respect to the first operating part 84 will return to the second initial position of the second operating part 86. The first spring 90A and the second spring 90B are realized by a compression coil spring or a plate spring.

The shifter 70 further comprises a detection device 92 that outputs a signal in response to the movement of the operating unit 82 with respect to the winding element 76. The detection device 92 comprises a first detector 94 and a second detector 96. The first detector 94 is a switch that is disposed between one end of the protrusion 84B in the circumferential direction and the recess 86B. The second detector 96 is a switch that is disposed between the other end of the protrusion 84B in the circumferential direction and the recess 86B. The first detector 94 and the second detector 96 are pressed by the second operating part 86 that moves with respect to the first operating part 84. The detection device 92 is set to ON when the amount that the second operating part 86 moves with respect to the first operating part 84 is greater than or equal to a prescribed amount and outputs an ON signal to the controller 28 (refer to FIG. 1). The first detector 94 and the second detector 96 are provided to be fixed to the protrusion 84B in FIG. 6, but they can be provided to be fixed to the recess 86B as well. Each switch can normally be off or can normally be on, but a switch that is normally off is preferable.

Figure 7:
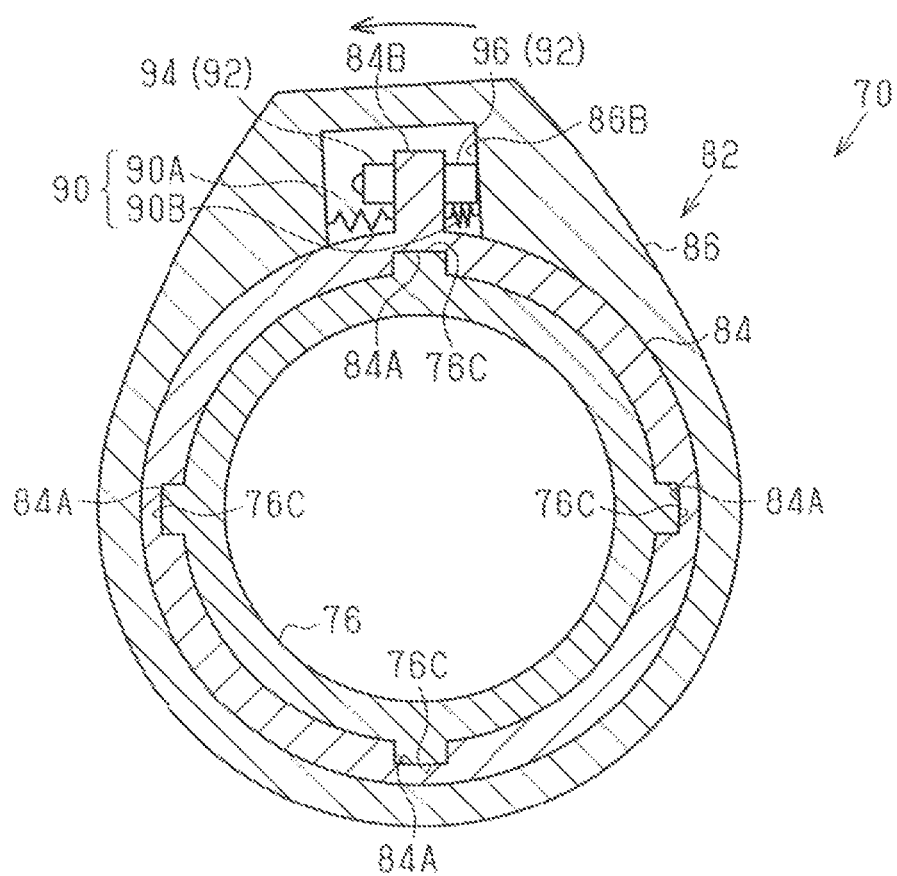
FIG. 7 is a cross-sectional view of the shifter with the second operating part is rotated from the position illustrated in FIG. 6.

The operation of the shifter 70 will be explained with reference to FIGS. 2 through 7. As the second operating part 86 is rotated in one circumferential direction as shown in FIG. 4 due to an operation by rider, the second operating part 86 rotates in one circumferential direction. That is, the second operating part 86 starts to move from the second initial position to the second prescribed position. When the inner surface of the recess 86B of the second operating part 86 comes into contact with the second detector 96, the second detector 96 outputs an ON signal. Then, when the relative rotational position of the second operating part 86 reaches the second prescribed position, as shown in FIG. 7, the first operating part 84 is rotated in one circumferential direction, when shifting is possible, by the second operating part 86 pressing the first operating part 84. In FIG. 7, the second operating part 86 is pressing the first operating part 84 via the second detector 96. However, there is the possibility of providing a regulating portion that regulates the relative rotation of the second operating part 86 and the first operating part 84 in one circumferential direction after the contact of the switch of the second detector 96 has been closed to at least one of either the second operating part 86 or the first operating part 84. In this case, the second operating part 86 can press the first operating part 84 via the regulating portion. By providing a regulating portion, preventing excessive force from being applied to the second detector 96 is possible. Meanwhile, in an operation to the upshift side, the phrase "when shifting is possible" describes a case in which the current shift position is less than the maximum shift position. In an operation to the downshift side, the above is when the current shift position is greater than the minimum shift position.

At this time, due to the force that is applied to the winding element 76, the triangular pawl 76B is pushed up the triangular pawl 78A of the clutch 78, and the winding element 76 is rotated in one circumferential direction with respect to the clutch 78. With this arrangement, the winding amount of the cable 58 by the winding element 76 increases. That is, the cable 58 moves towards the shifter 70 and rotates the rotating body 56 of the connecting portion 54 shown in FIG. 3. With this arrangement, the shift position of the internal hub transmission 52 shown in FIG. 2 is changed.

As the second operating part 86 is rotated in the other circumferential direction due to an operation by the rider, the second operating part 86 rotates in the other circumferential direction. That is, the rotational position of the second operating part 86 starts to move from the second initial position to the second prescribed position. When the inner surface of the recess 86B of the second operating part 86 comes into contact with the first detector 94, the first detector 94 outputs an ON signal. Then, when the position of the second operating part 86 reaches the second prescribed position, which is bilaterally symmetric to FIG. 7, the first operating part 84 is rotated in the other circumferential direction when shifting is possible by the second operating part 86 pressing the first operating part 84. In FIG. 7, the second operating part 86 is pressing the first operating part 84 via the first detector 94. However, there is the possibility of providing a regulating portion that regulates the relative rotation of the second operating part 86 and the first operating part 84 in one circumferential direction after the contact of the switch of the first detector 94 is closed to at least either the second operating part 86 or the first operating part 84, and the second operating part 86 can press the first operating part 84 via the regulating portion. By providing a regulating portion, preventing excessive force from being applied to the first detector 94 is possible.

At this time, due to the force that is applied to the winding element 76, the triangular pawl 76B pushes the triangular pawl 78A of the clutch 78 up, and the winding element 76 is rotated in the other circumferential direction with respect to the clutch 78. With this arrangement, the winding amount of the cable 58 by the winding element 76 decreases. For this reason, the cable 58 moves to the transmission device 26 side shown in FIG. 2 and rotates the rotating body 56 of the connecting portion 54 shown in FIG. 3. With this arrangement, the shift position of the internal hub transmission 52 is changed.

As shown in FIG. 1, the drive force from the crank arms 30 and the drive force from the assist motor 42 are inputted into the internal hub transmission 52. When changing the shift position, the internal hub transmission 52, as shown in FIG. 2, changes the connection state of the gears that form the planetary gear mechanism by operating a mechanical element that is moved by the cable 58. As the force that is input to the internal hub transmission 52 becomes larger, the operating of the mechanical element becomes more difficult. For this reason, the controller 28 controls the assist motor 42 based on the output signal from the detection device 92.

Figure 8:
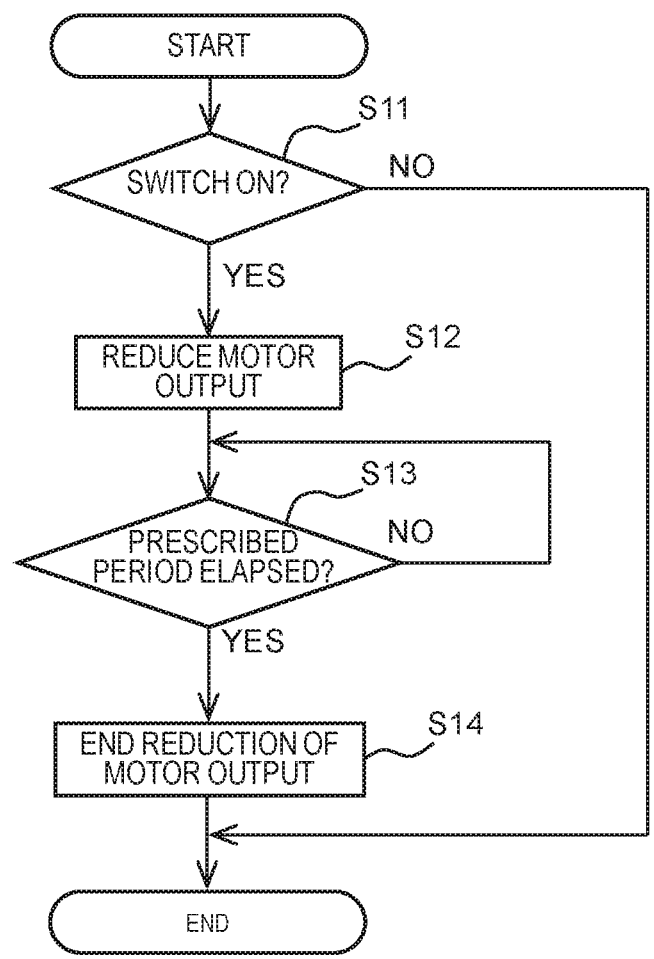
FIG. 8 is a flowchart showing a process executed by the controller for controlling the assist motor of the bicycle illustrated in FIG. 1.

The procedure that the controller 28 carries out each prescribed period will be described with reference to FIG. 8. FIG. 8 represents one example of a program that is executed by the controller 28 for controlling the assist motor 42 based on the operation of the shifter 70, which controls the transmission device 26.

As shown in step S11, the controller 28 assesses whether or not the switch of the first detector 94 or the second detector 96 has been turned ON. Specifically, when an ON signal from the first detector 94 or the second detector 96 has been input, an assessment is made that the switch of the first detector 94 or the second detector 96 has been turned ON, and the operation proceeds to step S12.

Next, the controller 28 reduces the output of the assist motor 42 in step S12. Then, the controller 28 assesses whether or not a prescribed time TX has elapsed after reducing the output of the assist motor 42. The prescribed time TX is preferably set to a time that is sufficiently longer than a standard time that is determined to be necessary for changing the shift position with the internal hub transmission 52 (refer to FIG. 2).

The controller 28 repeats the assessment operation of step S13 until the prescribed time TX has elapsed after reducing the output of the assist motor 42. When an assessment is made that the prescribed time TX has elapsed after reducing the output of the assist motor 42, the controller 28 then ends the control for reducing the output of the assist motor 42 in step S14 and ends the present operation. As a result, the output of the assist motor 42 is increased.

Figure 9:
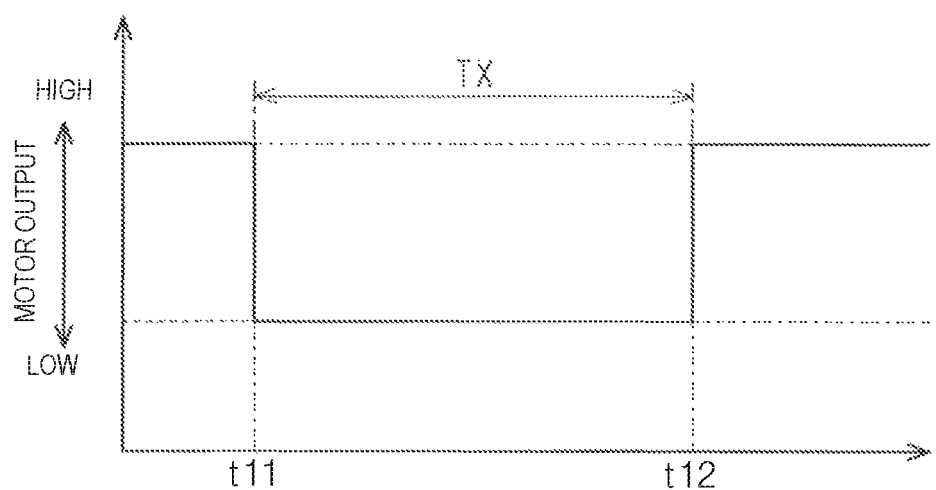
FIG. 9 is a timing chart illustrating the procedure for controlling the assist motor with the controller illustrated in FIG. 1.

As shown in FIG. 9, in the controller 28, the output of the assist motor 42 becomes smaller between a time t11 when the switch of the first detector 94 or the second detector 96 is turned ON to a time t12 when a prescribed time TX has elapsed after the time t11, as compared to the output prior to the time t11. Additionally, when the manual drive force has not changed after the time t12, the output of the assist motor 42 becomes the same amount as the output prior to the time t11. The output of the assist motor 42 varies according to the manual drive force, so that, when the manual drive force increases and decreases while the output of the assist motor 42 is reduced, the assist motor 42 outputs an assisting force according to the varying manual drive force after the time t12.

The bicycle electric system has the following actions and effects. (1) The shifter 70 outputs an ON signal to the controller 28 in response to the movement of the operating unit 82 with respect to the winding element 76. For this reason, the controller 28 is able to control the output of the assist motor 42 according to an operation to change the gear ratio with the internal hub transmission 52. For this reason, the shifting performance is improved.

(2) The detection device 92 outputs an ON signal to the controller 28 in a free range in which the winding element 76 does not move even if the operating unit 82 moves. That is, an ON signal is output to the controller 28 before the winding element 76 starts to move the cable 58. For this reason, controlling the output of the assist motor 42 before the internal hub transmission 52 starts the operation to change the gear ratio is possible. As a result, the shifting performance is further improved.

(3) The shifter 70 comprises a return mechanism 90. For this reason, when a rider is not operating the operating unit 82, the position of the second operating part 86 with respect to the first operating part 84 is returned to the initial position of the second operating part 86. As a result, when the operating unit 82 is not operated, the detection device 92 is suppressed from outputting an ON signal. For this reason, preventing a reduction in the output of the assist motor 42 at an inappropriate time is possible.

Second Embodiment

Figure 10:
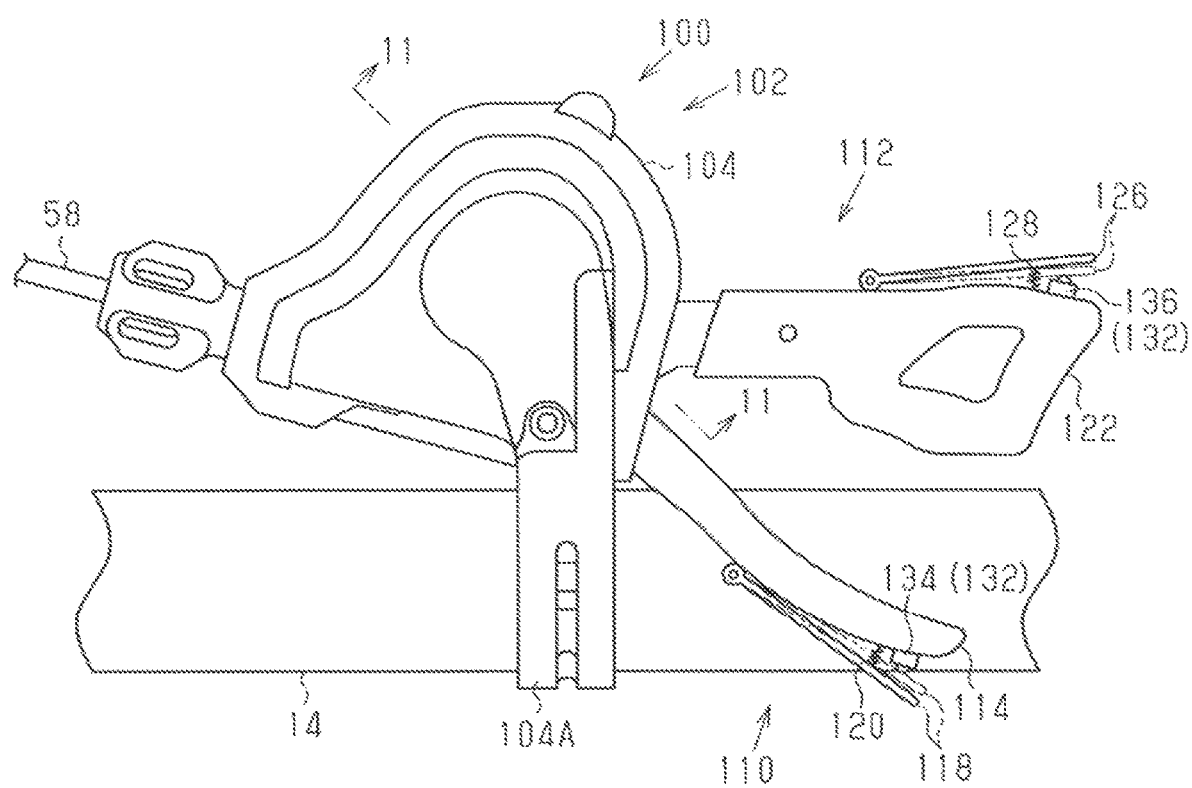
FIG. 10 is a perspective view of a shifter that is mounted to the bicycle according to a second embodiment.

A bicycle electric system of a second embodiment comprises the assist mechanism 22, the transmission device 26 and the controller 28 of the first embodiment, which are discussed above, and further comprises a lever-type shifter 100 as shown in FIG. 10 instead of the shifter 70.

Figure 11:
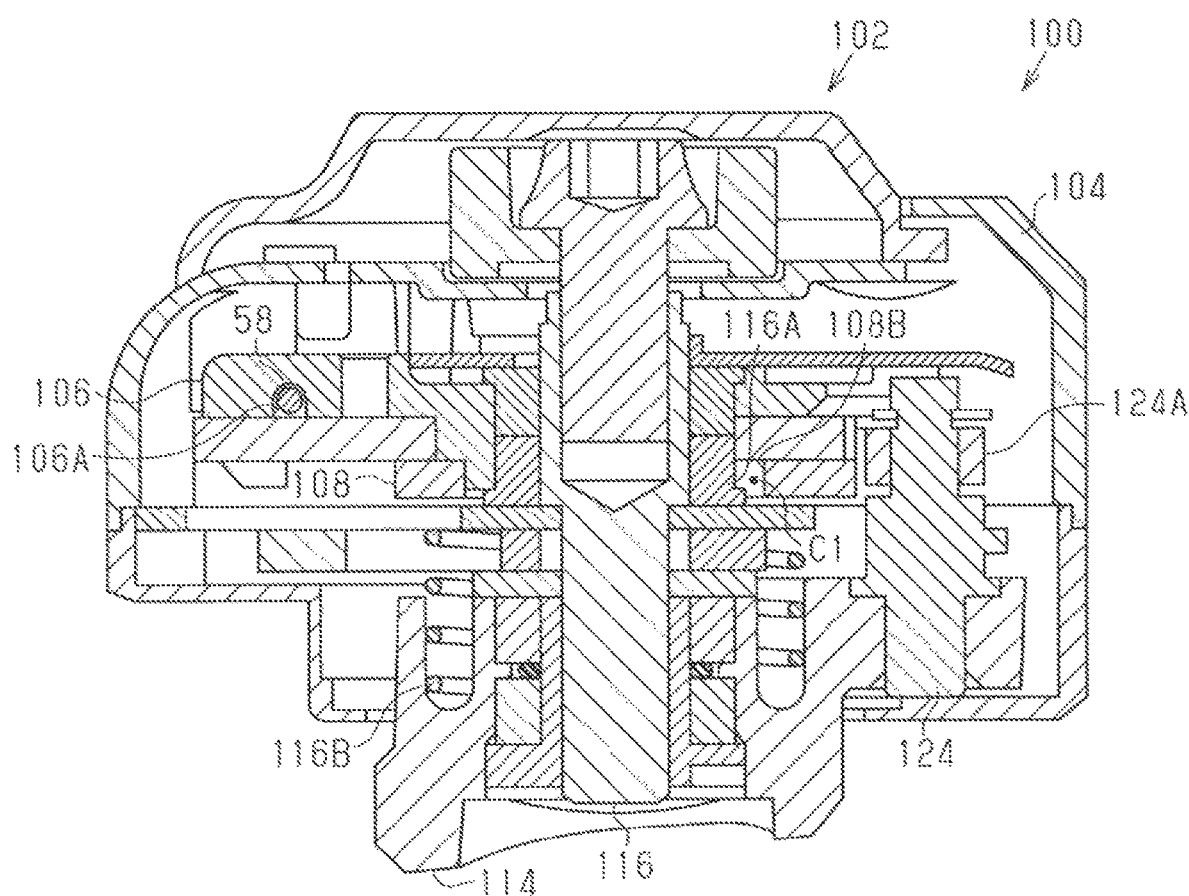
FIG. 11 is a cross-sectional view of the shifter as seen along section line 11-11 of FIG. 10.

As shown in FIG. 10, the shifter 100 comprises a main body portion 102 that is fixed to the handlebar 14. As shown in FIGS. 10 and 11, the main body portion 102 comprises a easing 104, a winding element 106 (see FIG. 11) and a ratchet 108. The casing 104 is attached to the handlebar 14 via a holder 104A (see FIG. 10). The winding element 106 is rotatably arranged inside the casing 104 for winding a cable 58. The ratchet 108 is coupled to the winding element 106. The ratchet 108 regulates the rotation of the winding element 106. The winding element 106 is a spool that comprises a groove 106A to which the end of the cable 58 is fitted. The ratchet 108 can be either a disk-shaped or fan-shaped member. The ratchet 108 comprises a plurality of ratchet teeth on the outer peripheral part.

As shown in FIG. 10, the shifter 100 comprises an operating member 110 for upshifting. The operating member 110 is rotatably attached to the main body portion 102 and moves the winding element 106 as the operating member 110 is pivoted. The shifter 110 also comprises an operating member 112 for downshifting. The operating member 112 is rotatably attached to the main body portion 102 and moves the winding element 106 as the operating member 110 is pivoted.

The operating member 110 comprises a first operating part 114, a lever shaft 116 (see FIG. 11) and a second operating part 118. The first operating part 114 is configured to move the winding element 106. The lever shaft 116 pivotally supports the first operating part 114 (refer to FIG. 11) within the casing 104. The second operating part 118 is coupled to the first operating part 114. The second operating part 118 is movable with respect to the first operating part 114.

As shown in FIG. 11, the first operating part 114 is a lever that is rotated around the lever shaft 116 that is provided to the main body portion 102. A male spline 116A is formed on the outer periphery of the lever shaft 116. The male spline 116A is fitted to a female spline 108B that is formed on the inner periphery of the ratchet 108. A clearance C1 is formed between the male spline 116A and the female spline 108B. For this reason, the ratchet 108 is able to move with respect to the lever shaft 116. A pull pawl 124A is provided to the first operating part 114 via an axle 124. The pull pawl 124A can engage with the ratchet teeth of the ratchet 108. The axle 124 is provided offset from the lever shaft 116. The axle 124 is provided to be parallel to the lever shaft 116. The pull pawl 124A is provided to be rotatable about the axle 124. When the first operating part 114 is operated from a first initial position in a first direction about the lever shaft 116, the pull pawl 124A engages with the ratchet teeth of the ratchet 108, and the ratchet 108 is rotated. With this arrangement, the winding element 106 is rotated, and the cable 58 is wound. A spring 116B is attached to the lever shaft 116. The spring 116B imparts a force toward a second direction of the lever shaft 116 to the first operating part 114 and the winding element 106. With this arrangement, when not being operated, the first operating part 114 is biased in the second direction of the lever shaft 116, is returned to the first initial position, and is rotated in a direction in which the winding element 106 returns to the first initial position when the positioning pawl mentioned below comes off the ratchet 108.

The second operating part 118 is attached to be relatively displaceable with respect to the first operating part 114. The second operating part 118 is preferably provided to a portion of the first operating part 114 with which the rider has contact and is provided covering the portion where the rider has contact. Here, the second operating part 118 is a lever that is rotatably attached to the first operating part 114. The rotational axis of the second operating part 118 is provided, for example, to be parallel to the rotational axis of the first operating part 114.

The first operating part 114 does not move even when the second operating part 118 moves in an interlocking range of the range in which the second operating part 118 is able to move. The interlocking range of movement ranges from a second initial position of the second operating part 118 to a second prescribed position. The second initial position is, for example, a position shown by the solid line in FIG. 10. The second initial position is the position of the second operating part 118 when an external force is not being applied to the second operating part 118. The second prescribed position is, for example, a position shown by the double-dashed line in FIG. 10. The second prescribed position is a position in which the second operating part 118 cannot move any further with respect to the first operating part 114.

The operating member 110 further comprises a return mechanism 120. The return mechanism 120 returns the second operating part 118 to the second initial position when the second operating part 118 is not being operated. The return mechanism 120 is a spring that is disposed between the first operating part 114 and the second operating part 118. The return mechanism 120 applies a reaction force to the second operating part 118 so that the position of the second operating part 118 with respect to the first operating part 114 will return to the second initial position of the second operating part 118.

For downshifting, the operating member 112 comprises a first operating part 122, a lever shaft 124 and a second operating part 126. The first operating part 122 is configured to move the winding element 106. The lever shaft 124 pivotally supports the first operating part 122. The second operating part 126 is coupled to the first operating part 122. The second operating part 126 is movable with respect to the first operating part 122.

The first operating part 122 is a lever, and the proximal end portion of the first operating part 122 is coupled to a second lever shaft (not shown) that is provided to the main body portion 102. The first operating part 122 is able to move with respect to the second lever shaft. A positioning pawl (not shown) and a retaining pawl (not shown) are provided to the first operating part 122. The positioning pawl is fitted to the ratchet teeth of the ratchet 108 and regulates the rotation of the ratchet 108 in a rotational position that corresponds to each shift position. The retaining pawl operates in conjunction with the positioning pawl and suppresses the ratchet 108 from immediately returning to the initial position when the retaining pawl comes off of the ratchet 108. That is, when the positioning pawl comes off of the ratchet 108, the retaining pawl engages with the ratchet 108. When the first operating part 122 is rotated from the first initial position in a second direction about the second lever shaft, the positioning pawl comes off of the ratchet 108, and the retaining pawl engages with the ratchet 108. With this arrangement, the ratchet 108 is rotated by one step in the direction to return to the initial position. The first operating part 122 is biased in a direction to return to the first initial position and returns to the first initial position when an operating force is not applied thereto. In the present embodiment, the operating directions of the operating member 110 for upshifting and the operating member 112 for downshifting from the initial positions are configured to be in opposite directions. The gear is shifted by the rider pressing the operating unit, in the case of the operating member 110 for upshifting, and by the rider pulling the operating unit, in the case of the operating member 112 for downshifting. As another embodiment, the operating direction from the initial position can be the same for the operating member 110 for upshifting and the operating member 112 for downshifting. That is, the configuration can be such that the gear is shifted by the rider pressing the operating member 110 for upshifting and pressing the operating member 112 for downshifting.

The second operating part 126 is attached to be relatively displaceable with respect to the first operating part 122. The second operating part 126 is preferably provided to a portion of the first operating part 122 with which the rider has contact, and is provided covering the portion where the rider has contact. Here, the second operating part 126 is a lever that is rotatably attached to the first operating part 122. The rotational axis of the second operating part 126 is provided, for example, to be parallel to the rotational axis of the first operating part 122.

The first operating part 122 does not move even when the second operating part 126 moves in an interlocking range of the range in which the second operating part 126 is able to move. The interlocking range of movement ranges from a second initial position of the second operating part 126 to a second prescribed position. The second initial position is, for example, a position shown by the solid line in FIG. 10. The second initial position is a position of the second operating part 126 when an external force is not applied to the second operating part 126. The second prescribed position is, for example, a position shown by the double-dashed line in FIG.

10. The second prescribed position is a position in which the second operating part 126 cannot move any further with respect to the first operating part 122.

The operating member 112 further comprises a return mechanism 128. The return mechanism 128 returns the second operating part 126 to the second initial position when the second operating part 126 is not being operated. The return mechanism 128 is a spring that is disposed between the first operating part 122 and the second operating part 126. The return mechanism 128 applies a reaction force to the second operating part 126 so that the position of the second operating part 126 with respect to the first operating part 122 will return to the initial position of the second operating part 126.

The shifter 100 further comprises a detection device 132 that outputs a signal in response to the movement of the operating members 110 and 112 with respect to the winding element 106. The detection device 132 comprises a first detector 134 and a second detector 136.

The first detector 134 is a switch that is disposed between the first operating part 114 and the second operating part 118. The first detector 134 is pressed by the second operating part 118 moving toward the side of the first operating part 114 with respect to the first operating part 114. The first detector 134 is set to ON when the amount that the second operating part 118 moves with respect to the first operating part 114 is greater than or equal to a prescribed amount and outputs an ON signal to the controller 28 (refer to FIG. 1).

The second detector 136 is a switch that is disposed between the first operating part 122 and the second operating part 126. The second detector 136 is pressed by the second operating part 126 moving with respect to the first operating part 122. The first detector 136 is set to ON when the amount that the second operating part 126 moves with respect to the first operating part 122 is greater than or equal to a prescribed amount and outputs an ON signal to the controller 28 (refer to FIG. 1). The first detector 134 and the second detector 136 are provided to be fixed to the first operating parts 114 and 122, respectively, in FIG. 10. However, they can also both be provided to be fixed to the second operating parts 118 and 126. Each switch can normally be off or can normally be on, but a switch that is normally off is preferable.

The operation of the shifter 100 will be explained with reference to FIG. 11. When the operating member 110 is pressed by an operation by the rider for upshifting, the second operating part 118 approaches the first operating part 114. That is, the position of the second operating part 118 starts to move from the initial position to the second prescribed position. When the position of the second operating part 118 reaches an intermediate position where the second operating part 118 comes in contact with the first detector 134, the first detector 134 outputs an ON signal. Then, when the position of the second operating part 118 reaches the second prescribed position, the first operating part 114 and the second operating part 118 will rotate the first operating part 114 in conjunction with each other.

At this time, the pull pawl 124A of the lever shaft 124 rotates the ratchet 108 in one circumferential direction with the lever shaft 124 rotating along with the first operating part 114. With this arrangement, the winding amount of the cable 58 with the winding element 106 increases. For this reason, the cable 58 moves towards the side with the shifter 100 and rotates the rotating body 56 of the connecting portion 54 shown in FIG. 3. With this arrangement, the shift position of the internal hub transmission 52 shown in FIG. 2 is changed. In FIG. 11, the second operating part 118 is pressing the first operating part 114 via the first detector 134. However, there is the possibility of providing a regulating portion that regulates the relative rotation of the second operating part 118 and the first operating part 114 after the contact of the switch of the first detector 134 is closed to at least either the second operating part 118 or the first operating part 114. In this case, the second operating part 118 can press the first operating part 114 via the regulating portion. By providing a regulating portion, preventing excessive force from being applied to the first detector 134 is possible.

When the operating member 112 for downshifting is pressed by an operation by the rider, the second operating part 126 approaches the first operating part 122. That is, the position of the second operating part 126 starts to move from the second initial position to the second prescribed position. When the position of the second operating part 126 reaches an intermediate position where the second operating pail 126 comes in contact with the second detector 136, the second detector 136 outputs an ON signal. Then, when the position of the second operating part 126 reaches the second prescribed position, the first operating part 122 and the second operating part 126 will rotate the first operating part 122 in conjunction with each other.

At this time, the positioning pawl of the first operating part 122 moves away from the ratchet 108. The ratchet 108 rotates in the other circumferential direction by the reaction force of the spring 116B. With this arrangement, the winding amount of the cable 58 by the winding element 106 decreases. For this reason, the cable 58 moves towards the side with the connecting portion 54 shown in FIG. 3, and rotates the rotating body 56 of the connecting portion 54. With this arrangement, the shift position of the internal hub transmission 52 shown in FIG. 2 is changed. The bicycle electric system has the effects according to (1) through (3) of the first embodiment.

Third Embodiment

Figure 12:
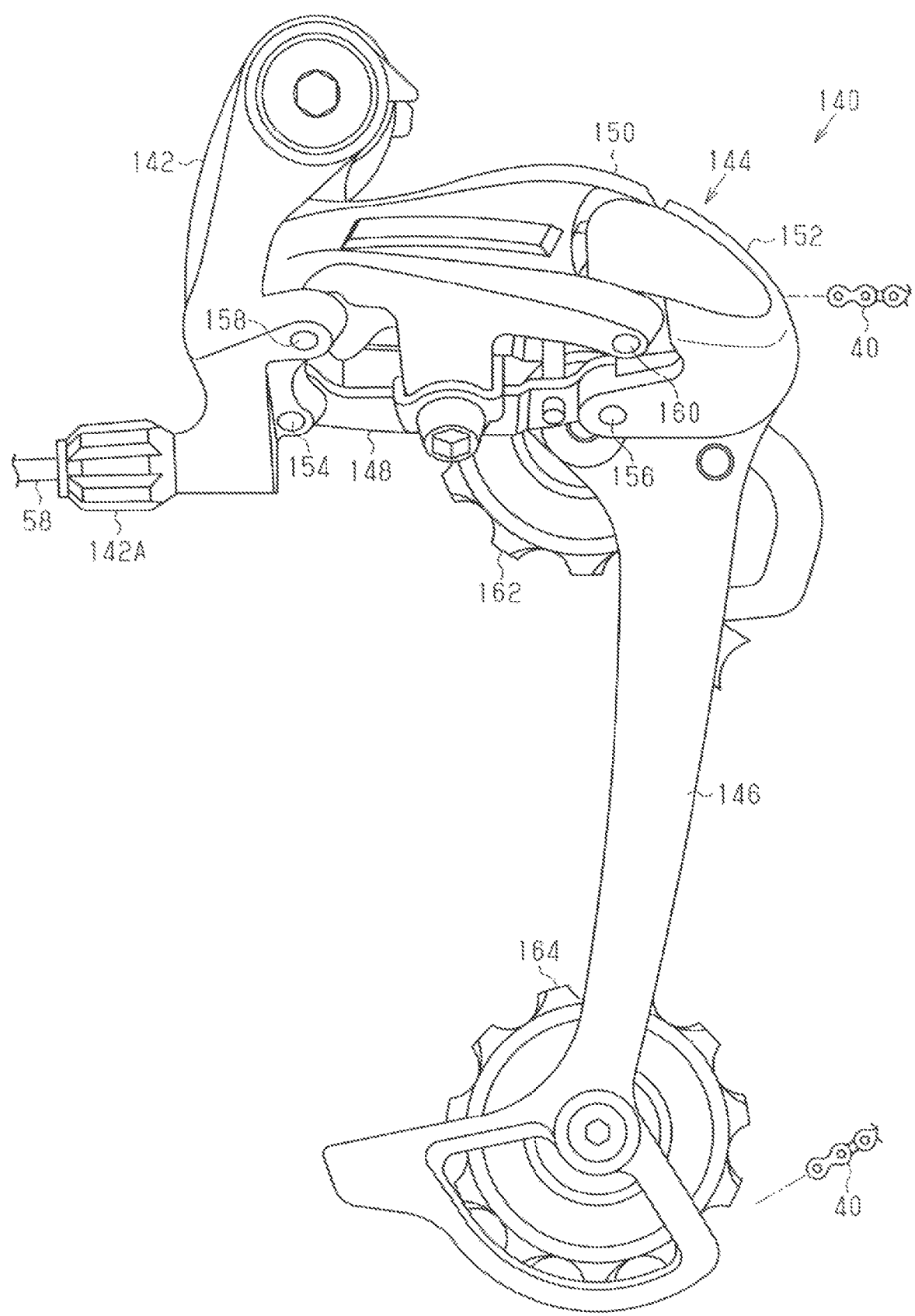
FIG. 12 is a perspective view of a gear shifting device of a bicycle electric system in accordance with a third embodiment.

A bicycle electric system of the third embodiment comprises the assist mechanism 22, the shifter 70, the controller 28 of the first embodiment, which are discussed above, and further comprises an external transmission 140 shown in FIG. 12 instead of the transmission device 26. Additionally, the rear sprocket 38 (refer to FIG. 1) is one in which a plurality of rear sprockets 38 with a different number of teeth are arranged in the axial direction. The configuration of the transmission 140 will be explained with reference to FIG. 12. The transmission 140 comprises a base member 142, a coupling mechanism 144 and a support member 146. The base member 142 can be attached to the frame 12 (refer to FIG. 1).

The base member 142 comprises a fixing portion 142A to which an end of the cable 58 is fixed. The coupling mechanism 144 comprises an inner link 148, an outer link 150 and a movable member 152.

The inner link 148 couples the base member 142 and the movable member 152. The inner link 148 rotates with respect to the base member 142. Specifically, one end of the inner link 148 and the movable member 152 are connected by a pivot pin 154. The inner link 148 is able to rotate about the pivot pin 154 with respect to the movable member 152. The other end of the inner link 148 and the movable member 152 are connected by a pivot pin 156. The inner link 148 is able to rotate about the pivot pin 156 with respect to the movable member 152.

The outer link 150 couples the base member 142 and the movable member 152. One end of the outer link 150 and the base member 142 are connected by a pivot pin 158. The outer link 150 is able to rotate about the pivot pin 158 with respect to the base member 142. The other end of the outer link 150 and the movable member 152 are connected by a pivot pin 160. The outer link 150 is able to rotate about the pivot pin 160 with respect to the movable member 152.

A spring that is not shown is disposed between the end of the outer link 150 on the side with the base member 142 and the end of the inner link 148 on the side with the movable member 152. This spring biases the movable member 152 so as to become the low-normal or the top-normal.

The movable member 152 is movably attached to the base member 142 via the inner link 148 and the outer link 150. The support member 146 is rotatably attached to the movable member 152. The support member 146 comprises a pair of plates and rotatably supports a guide pulley 162 and a tension pulley 164.

A chain 40 is wound to the guide pulley 162 and the tension pulley 164. The guide pulley 162 and the tension pulley 164 are rotated with respect to the support member 146 along with the rotation of the chain 40.

The operation of the transmission 140 will be explained with reference to FIG. 1 and FIG. 12. The transmission 140 changes the gear ratio of the bicycle 10 by engaging the chain 40 with different rear sprockets 38.

The inner link 148 rotates about the pivot pin 154 and the pivot pin 156 by the cable 58 moving due to an operation of the shifter 70. Additionally, the outer link 150 is rotated around the pivot pin 158 and the pivot pin 160. The support member 146 moves to the vehicle body center side or to the opposite side of the vehicle body center side due to an operation of the inner link 148 and the outer link 150. With this arrangement, the position of the chain 40 that is wound to the guide pulley 162 and the tension pulley 164 is changed, and the rear sprocket 38 to which the chain 40 is wound is changed. Additionally, with the support member 146 moving to the axial center side or to the opposite side of the axial center side of the rear sprocket 38, the position of the tension pulley 164 with respect to the rear sprocket 38 is changed, and the tension of the chain is adjusted. The bicycle electric system of the present embodiment also has the effects according to (1) through (3) of the first embodiment.

Fourth Embodiment

Figure 13:
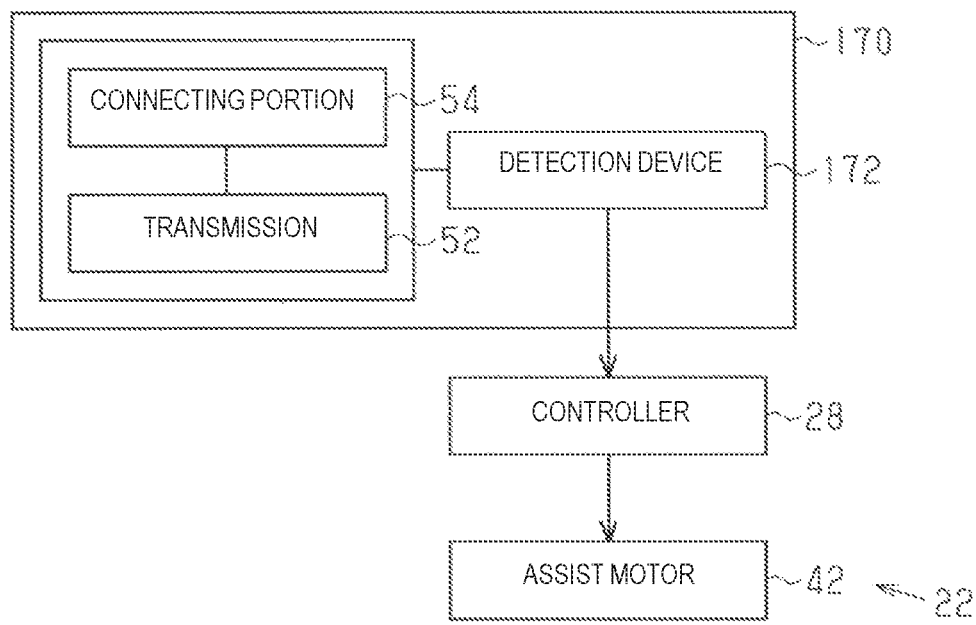
FIG. 13 is a block diagram of a bicycle electric system in accordance with a fourth embodiment.

A bicycle electric system of the fourth embodiment will be explained with reference to FIG. 13. The bicycle electric system comprises a transmission device 170 as well as the controller 28 and the assist mechanism 22 of the first embodiment. The transmission device 170 comprises the internal hub transmission 52 shown in FIG. 2, the connecting portion 54 shown in FIG. 3, and the detection device 172. The detection device 172 outputs a signal corresponding to the movement of the internal hub transmission 52 to the controller 28. For example, the detection device 172 detects the movement of the rotating body of the connecting portion 54 and outputs a signal to the controller 28. The detection device 172 can be configured by a potentiometer, a magnetic sensor, or a rotary encoder and may be any sensor that is capable of detecting the relative rotational position of the fixing portion of the connecting portion 54 and the rotating body 56. The controller 28 reduces the output of the assist motor 42 when an assessment is made that the gear ratio is being changed by the transmission device 170, based on a signal from the detection device 172.

According to the bicycle electric system, controlling the output of the assist motor 42 is possible according to the operation of changing the gear ratio by the transmission device 170. For this reason, the shifting performance is improved.

Fifth Embodiment

A bicycle electric system of the fifth embodiment will be explained with reference to FIG. 14. The bicycle electric system comprises a shifter 180 and a transmission device 182 as well as the controller 28 and the assist mechanism 22 of the first embodiment. The shifter 180 is electrically connected to the controller 28. The controller 28 controls the transmission device 182 based on a signal from the shifter 180.

Figure 14:
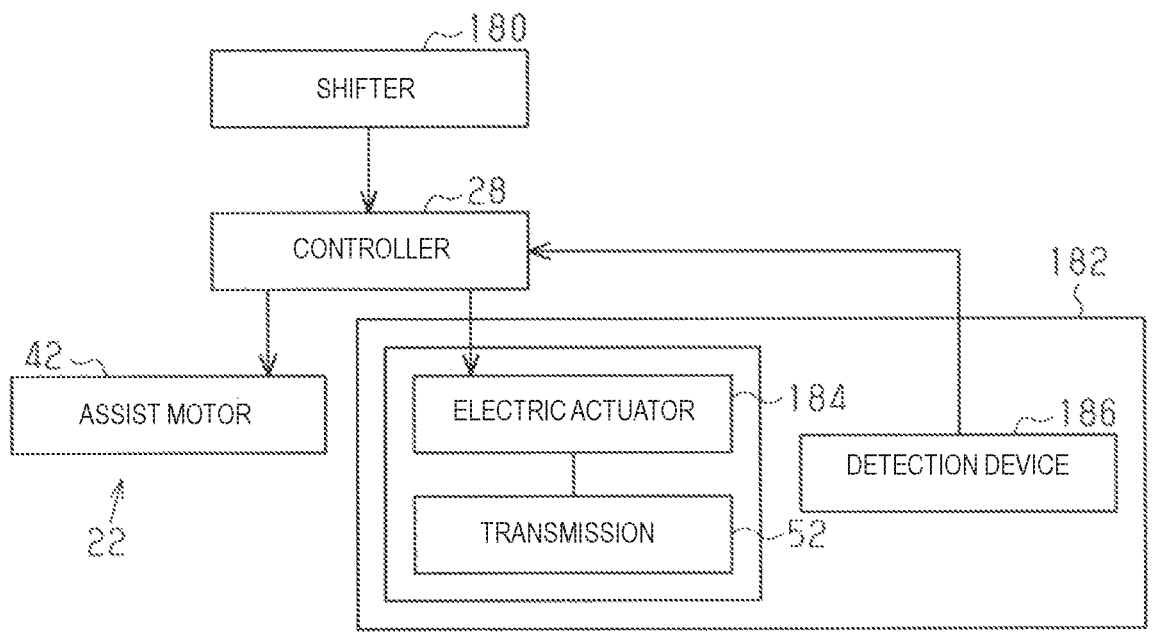
FIG. 14 is a block diagram of a bicycle electric system in accordance with a fifth embodiment.

The transmission device 182 comprises the internal hub transmission 52 shown in FIG. 2, an electric actuator 184 shown in FIG. 14, and a detection device 186. The electric actuator 184 comprises an electric motor and may further comprise a reduction gear. The detection device 186 outputs a signal corresponding to the movement of the electric actuator 184 to the controller 28. For example, the detection device 186 outputs a signal corresponding to the rotation angle of the output shaft of the electric actuator 184, the intermediate shaft of the reduction gear, or the electric motor shaft. The controller 28 reduces the output of the assist motor 42 when an assessment is made that the gear ratio is being changed by the transmission device 182, based on a signal from the detection device 186. The detection device 186 is configured by, for example, a potentiometer, a magnetic sensor, or a rotary encoder.

According to the bicycle electric system, controlling the output of the assist motor 42 is possible according to the operation of changing the gear ratio by the transmission device 182. For this reason, the shifting performance is improved.

Sixth Embodiment

Figure 15:
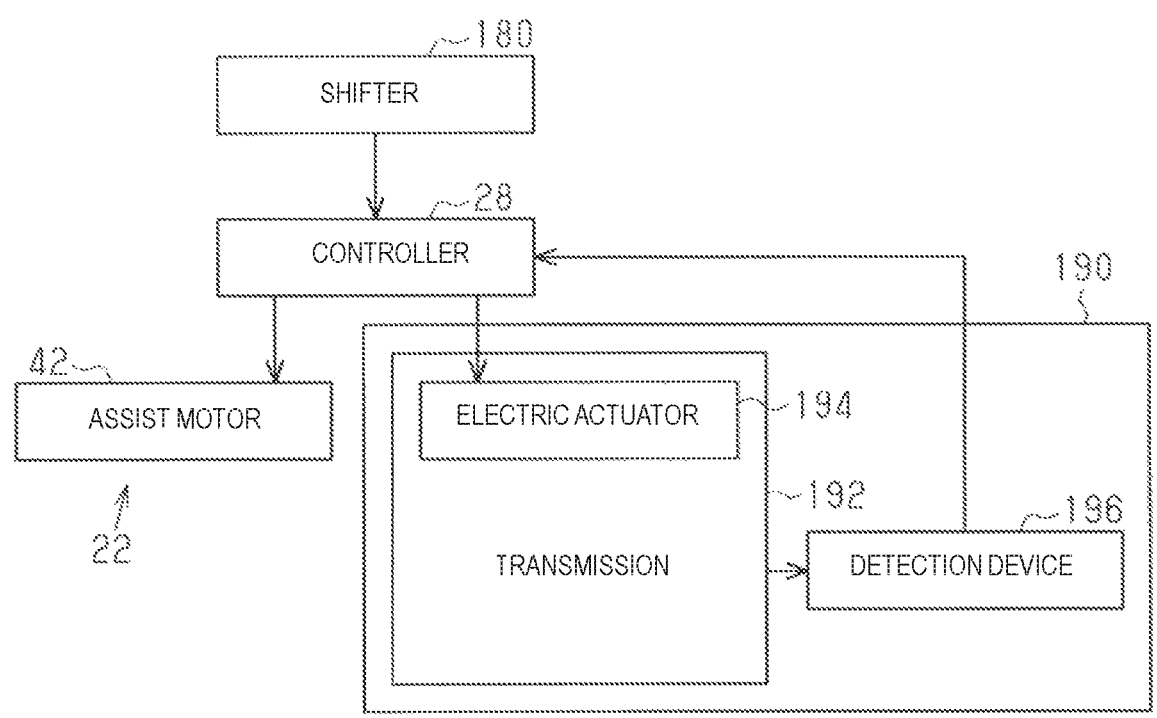
FIG. 15 is a block diagram of a bicycle electric system in accordance with a sixth embodiment.

A bicycle electric system of the sixth embodiment will be explained with reference to FIG. 15. The bicycle electric system comprises a transmission device 190 as well as the controller 28 and the assist mechanism 22 of the first embodiment, and the shifter 180 of the fifth embodiment. The transmission device 190 comprises a transmission 192 comprising an electric actuator 194 and a detection device 196. The transmission 192 is one in which, for example, the electric actuator 194 is mounted to a fixing portion 142A of the transmission 140, as shown in FIG. 12, and a coupling mechanism 144 (refer to FIG. 12) is operated by driving the electric actuator 194.

The detection device 196 outputs a signal corresponding to the movement of the transmission 192 to the controller 28. For example, the detection device 196 outputs a signal corresponding to the rotation angle of the coupling mechanism 144 to the controller 28. Specifically, the detection device 196 detects the rotation of the coupling mechanism 144 about the pivot pin 154 or the pivot pin 158 with respect to the fixing portion 142A, the rotation of the movable member 152 about the pivot pin 156 or the pivot pin 160 with respect to the coupling mechanism 144, or the rotation of the support member 146 with respect to the movable member 152. The detection device 196 is configured by, for example, a potentiometer, a magnetic sensor, or a rotary encoder. The detection device 196 is disposed between at least the fixing portion 142A, the coupling mechanism 144, or the support member 146. The controller 28 reduces the output of the assist motor 42 when an assessment is made that the gear ratio is being changed by the transmission device 182, based on a signal from the detection device 196.

According to the bicycle electric system, controlling the output of the assist motor 42 is possible according to the operation of changing the gear ratio by the transmission device 190. For this reason, the shifting performance is improved.

Modified Examples

The present bicycle electric system can is not limited to the configurations described in the above embodiments. The present bicycle electric system, etc., can have various configurations that are different from the above-described embodiments. The modified examples of the above-described embodiments explained below are example of the various alternative configurations of the present bicycle electric system.

Forming a recess on the outer periphery of the first operating part 84 and forming a protrusion on the inner periphery of the second operating part 86 of the first embodiment is possible.

The configuration can be such that the first operating part 84 of the first embodiment is omitted and the second operating part 86 is provided to the outer periphery of the winding element 76. In this case, the shape of the portion of the winding element 76 that is surrounded by the second operating part 86 shall be formed to have the same shape as the first operating part 84.

Either the first detector 94 or the second detector 96 of the first embodiment can be omitted. In this case, the output of the assist motor 42 is controlled when either upshifting or downshifting.

Either the first detector 134 or the second detector 136 of the second embodiment can be omitted. In this case, the output of the assist motor 42 is controlled when either upshifting or downshifting.

The detection device 92 of the first embodiment and the detection device 132 of the second embodiment can be changed to an optical sensor. For example, an optical sensor is attached to either the first operating parts 84, 114, and 122 or the second operating parts 86, 118, and 126 and outputs a signal according to the movement amount of the other.

Additionally, in the first embodiment and the second embodiment, the second operating parts 86, 118, and 126 can be omitted, and the movement of the first operating parts 84, 114, and 122 can be detected by a detection device that is realized by an optical sensor, magnetic sensor, or the like. The detection device is provided to each of the cases 74 and 104. In this case, the configuration is such that the detection device outputs a signal to the controller after the first operating parts 84, 114, and 122 have been activated from the first initial position until before the winding elements 76 and 106 are activated.

The shifter 100 of the second embodiment can be changed to a shifter in which the operating member 110 for upshifting is integrally configured with the operating member 112 for downshifting. With this shifter, upshifting is carried out with a rotation in one direction with respect to the lever shaft, and downshifting is carried out with a rotation in the other direction with respect to the lever shaft.

The shifters 70 and 100 of the first and the second embodiments can be equipped with a microcomputer having a processor and one or more memory devices. The detection devices 92 and 132 are electrically connected to the microcomputer. The microcomputer is electrically connected to the controller 28 and transmits the signal of the detection devices 92 and 132 to the controller 28. The microcomputer and the controller 28 can communicate by, for example, power line communication (PLC).

The configuration is such that the first operating parts 114 and 122 of the shifter 100 of the second embodiment do not move relative to the winding element 106. The effect (2) of the first embodiment can also be achieved in this case.

The controller 28 of the first to the third embodiments can reduce the output of the assist motor 42 or can turn the output of the assist motor 42 OFF when the time during which the output signal from the detection devices 92 and 132 are inputted is greater than or equal to a threshold value. In this case, preventing a reduction in the output of the assist motor 42 when the rider does not intend to change the shift position is possible, and the second operating parts 86, 118, and 126 are moved by the touch of the hand of the rider or the like.

The detection device 186 of the sixth embodiment can be changed to one that outputs a signal corresponding to the movement of the electric actuator 194 to the controller 28 in the same way as the fifth embodiment.

The transmission device of each embodiment can be a front transmission such as a front derailleur or a front internal transmission device.

The controller 28 of each embodiment may turn the assist motor 42 OFF when changing the gear ratio. In this case, in step S14, the assist motor 42 is turned ON.

The controller 28 of each embodiment can end the control to reduce the output of the assist motor 42 when transmission has been completed in step S13. The phrase "when transmission is completed" is preferably when the transmission has been operated and the gear ratio has been changed. A gear shift detection device for detecting that the transmission has been completed is configured by comprising a speed sensor for detecting the speed of the bicycle, a cadence sensor for detecting the number of revolutions of the crank, a gear number detection sensor for detecting the shift position, and a controller. In this case, the controller stores the tire circumferential length and a gear ratio that corresponds to each shift position in advance, and the detection device can accurately detect by calculating that the changing of the gear ratio has been completed based on the detection results from each sensor. Additionally, a determination can be made that the transmission has been completed by, for example, using the output signal from the detection devices 172, 186, and 196 of the fourth to the sixth embodiments. The detection devices 172, 186, and 196 are configured by a sensor that is capable of detecting the angular position. In this case, the detection devices 172, 186, and 196 correspond to the gear shift detection device.

The configuration can be such that, in the sixth embodiment, the electric actuator 194 is removed from the transmission 192, and the transmission 192 is controlled by the cable 58 as in the third embodiment. In this case, for the shifter, a common shifter that does not comprise a sensor can be used.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle transmission device comprising:
   a transmission;
   a wheel axle;
   a connecting portion having a rotating body that is rotatably mounted on the wheel axle and being operatively connected to the transmission;
   a cable coupled to the connecting portion to operate the transmission, the cable having an end that is connected to an outer periphery of the rotating body so that the cable winds around the rotating body as the rotating body rotates; and
   a detector arranged to detect movement of the connecting portion.

2. A bicycle electric system including the bicycle transmission device as recited in claim 1, and further comprising:
   a controller programmed to control an assist motor for assisting a manual drive force based on a signal from the detector, the controller being programed to either reduce an output of the assist motor or stop the output of the assist motor based on the signal.

3. The bicycle electric system as recited in claim 2, wherein
   the controller is programed to reduce either the output of the assist motor or stop the output of the assist motor at a time that the signal is greater than or equal to a threshold value.

4. The bicycle electric system as recited in claim 2, wherein
   the controller is programed to increase the output of the assist motor at a time that the output of the assist motor that has been reduced is greater than or equal to a threshold value, or turn the output of the assist motor ON at a time that the output of the assist motor has been stopped is greater than or equal to a threshold value.

5. The bicycle electric system as recited in claim 2, further comprising
   a gear shift detector configured to output a signal when a gear shift of the transmission has been completed,
   the controller being programmed to increase the output of the assist motor or turns the output of the assist motor ON, when the signal of the gear shift detector has been input while the output of the assist motor is being reduced, or when the output of the assist motor has been stopped.

6. A bicycle transmission device comprising:
   an internal transmission;
   a connecting portion operatively connected to the internal transmission;
   a cable coupled to the connecting portion to operate the internal transmission; and
   a sensor arranged to detect a rotational movement of the connecting portion about a rotational axis that is parallel to a rotational axis of the internal transmission.

7. A bicycle electric system comprising:
   a transmission;
   a detector arranged to detect movement of the transmission, the detector being configured to change operating states between an ON state and an OFF state of the detector, the detector is configured to change to the ON state based on a detected rotational movement of the transmission exceeding a threshold value;
   a gear shift sensor configured to output a signal when a gear shift of the transmission has been completed; and
   a controller programmed to
   control an assist motor for assisting a manual drive force based on a signal from the detector, either reduce an output of the assist motor or stop the output of the assist motor based on the signal from a time when the detector changes to the ON state and to a prescribed time when the detector has changed to the OFF state,
   increase the output of the assist motor in the event that the signal of the gear shift sensor has been input while the output of the assist motor is being reduced, or in the event that the output of the assist motor has been stopped.

8. The bicycle electric system as recited in claim 7, wherein
   the controller is programed to reduce either the output of the assist motor or stop the output of the assist motor when the signal is greater than or equal to the threshold value.

9. The bicycle electric system as recited in claim 7, wherein
   the controller is programed to increase the output of the assist motor when the output of the assist motor that has been reduced is greater than or equal to a threshold value, or turn the output of the assist motor ON when the output of the assist motor has been stopped is greater than or equal to the threshold value.

10. The bicycle electric system as recited in claim 7, wherein
    the controller is programmed to turn the output of the assist motor ON in the event that the signal of the gear shift sensor has been input while the output of the assist motor is being reduced, or in the event that the output of the assist motor has been stopped.

11. A bicycle electric system comprising:
    a transmission;
    an electric actuator configured to operate the transmission;
    a detector disposed on the transmission device to detect a rotational movement of the electric actuator, the detector being configured to change operating states between an ON state and an OFF state; and
    a controller programmed to control an assist motor for assisting a manual drive force based on a signal from the detector,
    the controller being programmed to either reduce an output of the assist motor or stop the output of the assist motor based on the signal from a time when the detector changes to the ON state and to a prescribed time when the detector has changed to the OFF state.

12. The bicycle electric system as recited in claim 11, wherein
    the controller is programed to reduce either the output of the assist motor or stop the output of the assist motor when the signal is greater than or equal to a threshold value.

13. The bicycle electric system as recited in claim 11, wherein
    the controller is programed to increase the output of the assist motor when the output of the assist motor that has been reduced is greater than or equal to a threshold value, or turn the output of the assist motor ON when the output of the assist motor has been stopped is greater than or equal to a threshold value.

14. The bicycle electric system as recited in claim 11, further comprising
    a gear shift detector configured to output a signal when a gear shift of the transmission has been completed,
    the controller being programmed to increase the output of the assist motor or turns the output of the assist motor ON, when the signal of the gear shift detector has been input while the output of the assist motor is being reduced, or when the output of the assist motor has been stopped.

15. A connecting portion comprising:
an axle mounting part configured to be mounted on a wheel axle;
a rotating body provided to the axle mounting part in a position radially outward of the axle mounting part from the wheel axle, the rotating body further being rotatable with respect to the axle mounting part, the rotating body configured to be attached to a cable coupled to operate a transmission and being rotatable with respect to a longitudinal axis of the wheel axle; and
a detector arranged to detect movement of the rotating body.

* * * * *